United States Patent [19]

Brunell et al.

[11] Patent Number: 5,445,562

[45] Date of Patent: Aug. 29, 1995

[54] POULTRY PRESS

[76] Inventors: Richard F. Brunell; Patricia W. Brunell, both of 306 Pine Shadow La., Lake Mary, Fla. 32746

[21] Appl. No.: 219,484

[22] Filed: Mar. 29, 1994

[51] Int. Cl.$^6$ .................... A22C 17/00; A22C 21/00
[52] U.S. Cl. .................... 452/138; 100/283; 100/293
[58] Field of Search ............. 452/138, 136, 135, 16, 452/17; 100/283, 293, 281, 179, 910, 902, 213, 233, 234, 237

[56] References Cited

U.S. PATENT DOCUMENTS

| | | | |
|---|---|---|---|
| 217,519 | 7/1879 | Fanning | 100/283 |
| D. 274,624 | 7/1984 | Difede | 100/293 |
| 1,510,313 | 9/1924 | Dickerson | 452/16 |
| 3,412,425 | 11/1968 | Strum | 17/45 |
| 3,629,903 | 12/1971 | Turner | 17/11 |
| 4,014,075 | 3/1977 | van Bergen | 17/1 G |
| 4,323,009 | 4/1982 | Voigit | 100/283 |
| 4,377,884 | 3/1983 | Viscolosi | 17/11 |
| 4,380,849 | 4/1983 | Adkison et al. | 452/136 |
| 4,446,600 | 5/1984 | Holley et al. | 17/11 |
| 4,901,399 | 2/1990 | Hegelmann | 17/1 G |
| 5,064,403 | 11/1991 | Elsten | 452/135 |
| 5,090,940 | 2/1992 | Adkison | 452/136 |
| 5,267,891 | 12/1993 | Cresson et al. | 452/136 |
| 5,288,263 | 2/1994 | Ayala | 452/16 |

Primary Examiner—Willis Little
Attorney, Agent, or Firm—Edward M. Livingston

[57] ABSTRACT

A press with a base portion (1) having two side walls (15a and 15b), a support plate (3) and an aperture (12) at one end of the support plate and a press portion (16) mounted on the support plate (3) above the base portion (1). The press portion (16) has a handle (7) pivotly mounted on the support plate (3) at an end opposite the aperture (12). A press shaft (9) extends downward from the handle (7). The press shaft (9) has a press cup (10) at its lower end to hold one end of a piece of meat or poultry, such as a chicken drumstick or wing. The bone end of a poultry drumstick, wing or other meat is placed into the aperture (12) and downward pressure is asserted on the handle (7) until the meat is clumped under the press cup (10) above the support plate (3) and the bone (14) is left exposed below the support plate (3). The resulting product is juicier, better tasting and easier to eat. The aperture (12) may contain a raised ridge (11) around it to better hold meat in place by keeping it from slipping during the pressing process. The press shaft (9) may be mounted on a boom (6), pivotly mounted to the handle (7) for better alignment for various sizes of meat.

3 Claims, 2 Drawing Sheets

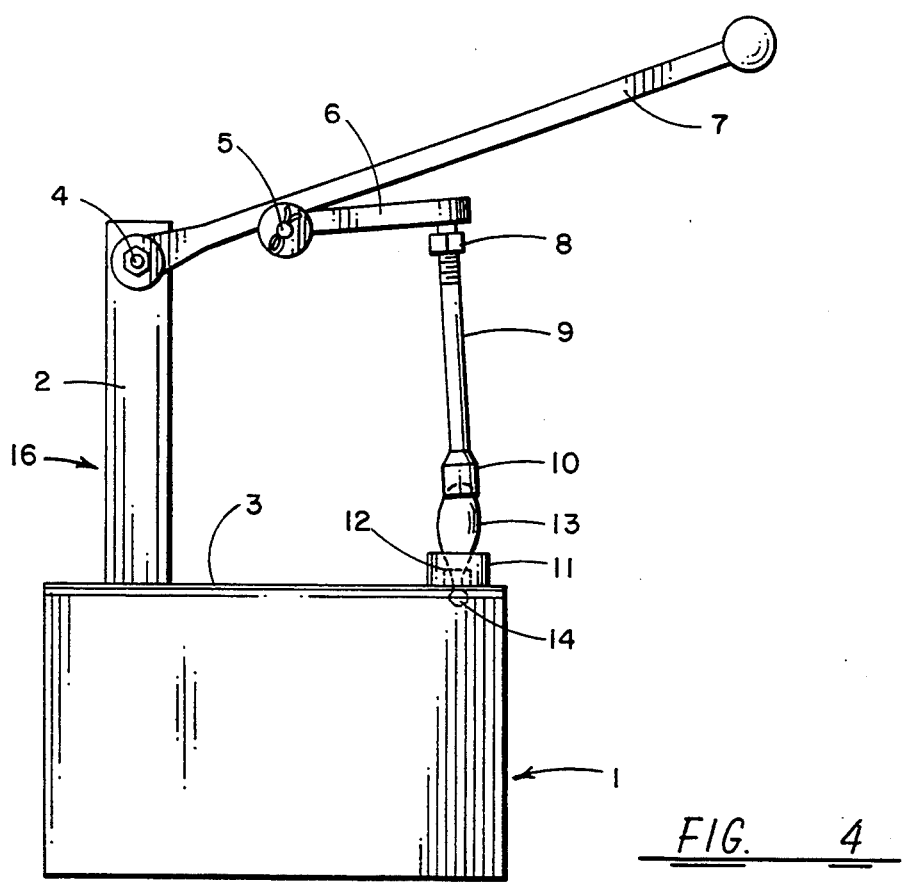
FIG. 4
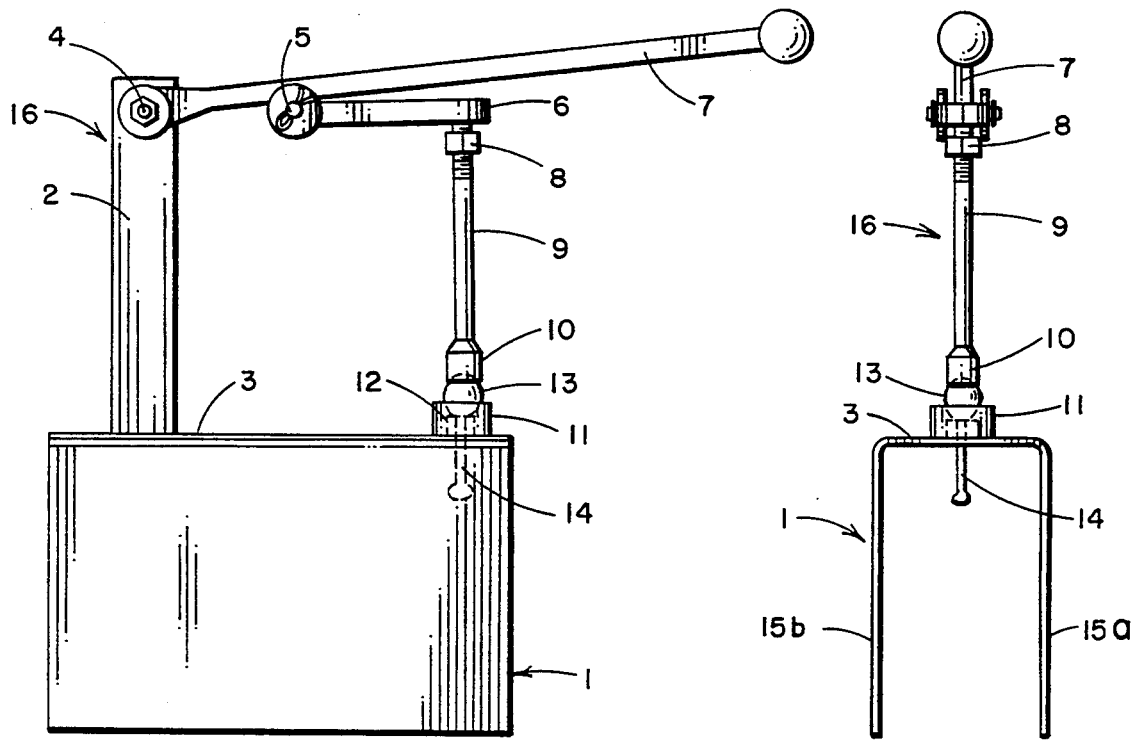
FIG. 5
FIG. 6

POULTRY PRESS

BACKGROUND OF THE INVENTION

This invention relates generally to apparatuses for preparing meat on bones for eating, and more particularly to a press for making poultry, such as chicken, easier to prepare and more tasteful to eat.

Spicy chicken wings and drumsticks, commonly called "buffalo wings", are popular appetizers served at many restaurants and sold in supermarkets for home eating. Unfortunately, eating "buffalo wings" and other products made from chicken wings and drumsticks can present some problems. One problem is that such wings are messy to eat and much care must be taken that clothes are not dirtied when eating them. Another problem is that chicken meat is difficult to get to and much of the meat is wasted as it is spread thinly over the bones, especially in the case of chicken wings. Even a further problem is that the chicken meat, particularly the meat on wings, if overcooked, becomes dried out and unappetizing to eat.

Some restaurants, particularly more expensive ones, prepare chicken wings and drumsticks to be served as hors d'oeuvres by pushing the meat along the bones so that the meat clumps at one end of the bone. Typically the meat can then be served with the meat end down and the clean bone sticking up. This latter technique eliminates much of the mess associated with eating chicken wings by leaving one end of the bone clean so it can be held while eating the chicken at the other end. Also, this latter technique causes the chicken clumped at one end to be generally moister and tastier. Furthermore, waste of meat is reduced since the meat is not spread out thinly along the bone as with traditional chicken wings. Unfortunately, in restaurants using the latter technique, it is still done entirely by hand which is very time consuming and messy.

Thus, there exists a need for a device that can prepare chicken wings and drumsticks quickly and easily while eliminating the mess associated with both preparing and eating the wings and which also results in a moister and better product.

The prior patented art does include some devices for preparing chicken on bones for eating and for stripping chicken from the bones, but none of the devices is like the present invention. For instance, U.S. Pat. No. 3,629,903 by Turner, issued Dec. 28, 1971, discloses a device for preparing a simulated drumstick from a chicken wing which has an elevated support plate with an aperture into which a bone can be inserted and the meat pushed to one end of the bone. However, the devices does not contain a press but must be done by hand. U.S. Pat. No. 3,412,425 by Sturm, issued Nov. 26, 1968, covers a method of producing simulated drumsticks from chicken wings by separating the bone and the meat and then pushing the meat to one end to form a chunk of meat. Although Strum uses substantially the same method as does the present invention, it does not disclose a press and thus, must be done by hand. U.S. Pat. No. 5,064,403 by Elsten, issued Nov. 12, 1991, teaches a hydraulic apparatus for deboning drumsticks. U.S. Pat. No. 4,014,075 by Van Bergen, issued Mar. 29, 1977, discloses a device with chambers having a press which pushes meat from the bones and extrudes it in a paste form. U.S. Pat. No. 4,377,884 by Viscolosi, issued Mar. 29, 1983, shows an apparatus for deboning chicken using stripper jaws to remove the meat. U.S. Pat. No. 5,090,940 by Adkison, issued Feb. 25, 1992, shows yet another apparatus for removing meat from the bones, but it is rather complex and much different from the present invention. U.S. Pat. No. 4,446,600 by Hooley, et al., issued May 8, 1984, teaches another machine for stripping meat from bones which uses a cam and stripping blades. Finally, U.S. Pat. No. 4,901,399 by Hegelmann, issued Feb. 20, 1990, teaches another apparatus for stripping meat from chicken which uses disks.

Thus, although there are many devices that either remove meat from the bone or push the meat to one end to form a "drumstick" effect, none uses a press having a structure like the present invention.

The objects and advantages of the present invention over the prior art will become readily apparent from the following discussion.

SUMMARY OF THE INVENTION

The primary object of the present invention is to provide a device that eliminates the need to prepare poultry wings such as chicken "buffalo wings" and hors d'oeuvres, by hand.

Another object of the present invention is to provide such a device that results in better, tastier and moister product.

A further object of the present invention is to reduce the waste of meat which occurs with normal chicken wings.

Another object of the present invention is to eliminate the mess associated with making such wings and hors d'oeuvres by hand.

An additional object of the present invention is to eliminate the mess associated with eating such chicken wings and hors d'oeuvres.

An even further object of the present invention is to provide a device that makes it easier and quicker to prepare chicken wings, drumsticks and hors d'oeuvres.

The present invention fulfills the above and other objects by providing a device for preparing poultry, particularly wings and drumsticks of chicken so that the meat thereon is gathered at one end and an exposed bone at the other. The device has a base portion having two side walls and a support plate mounted and elevated on the two side walls so as to leave an open area below the support plate between the two side walls. The support plate has an aperture at one end for inserting a bone of a chicken wing or drumstick. In addition to the base portion, the device has a press portion mounted on the support plate of the base portion, which has a handle pivotly mounted on a support plate. The handle is anchored at the end of the support plate opposite the aperture and extends over the support plate to a point over the aperture. A shaft extends downward from the handle so it aligns with the aperture and the support plate when the handle is pressed downward. At the end of the shaft is a plunger-shaped press cup for inserting the end of the chicken wing or drumstick opposite the bone. When the handle is pressed downward the bone is pushed through the aperture so that meat is pushed upward to the other end leaving the bone exposed at the lower end. The handle may be mounted on a vertical extension from the support plate to produce better leverage while pressing the poultry. The shaft may be pivotly mounted on the handle of the press portion as well to enable the press cup to be more easily aligned with the aperture regardless of the length of the wing or drumstick. A ridge around the aperture may be provided to better support and hold in place as well as keep the poultry from slipping during the pressing process.

Other objects and features of the present invention will become even more readily apparent when a detailed description of a preferred embodiment is described in conjunction with drawing figures.

BRIEF DESCRIPTION OF THE DRAWINGS

The drawing figures which are used in conjunction with a description of the preferred embodiment are as follows:

FIG. 4 is a side plan view of the poultry press showing its handle in a slightly raised position with a chicken drumstick in position before pressing;

FIG. 5 is a side plan view of the poultry press with a chicken drumstick after pressing down on the handle; and FIG. 6 is a partial end plan view of the poultry press showing a chicken drumstick after use of the press.

DESCRIPTION OF THE PREFERRED EMBODIMENTS

Figure 1:
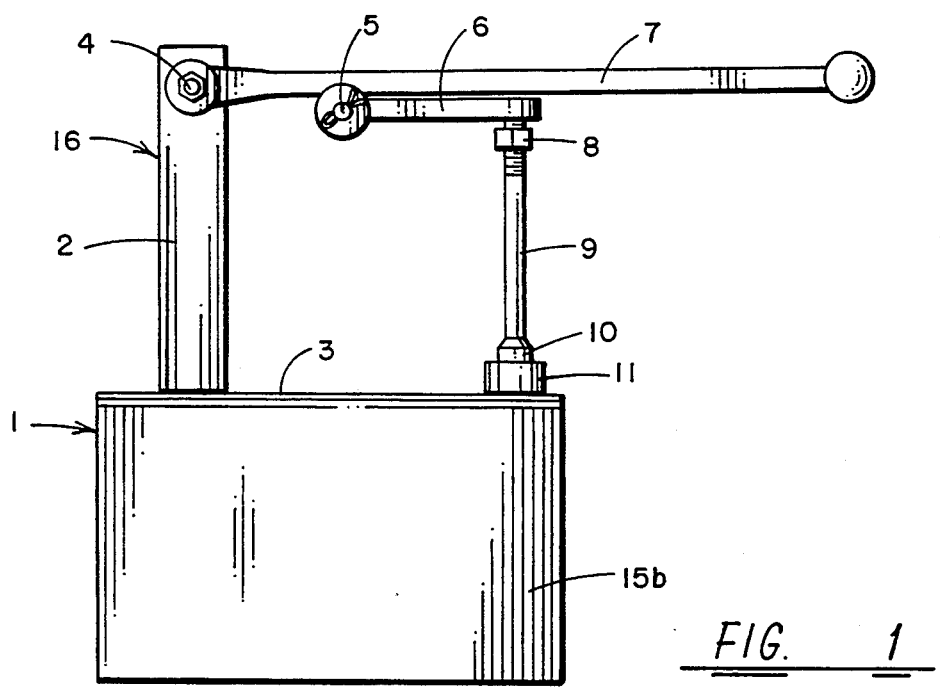
FIG. 1 is a side view of the poultry press by itself.

Referring to the drawing figures, particularly FIG. 1, the poultry press is shown by itself having a base portion 1 having a top support plate 3 and two side walls 15a and 15b and a press portion 16 consisting of a handle 7 pivotly mounted at its pivot point 4 on a vertical support 2. Attached to the handle 7 is a boom 6 which may be pivotly mounted at pivot point 5 by bolt and cotter pin. Extending from the boom 6 is a press shaft 9 mounted by holder 8 and having a press cup 10 at the bottom thereof. Also, on the base portion is a ridge 11 which surrounds an aperture in the base portion.

Figure 2:
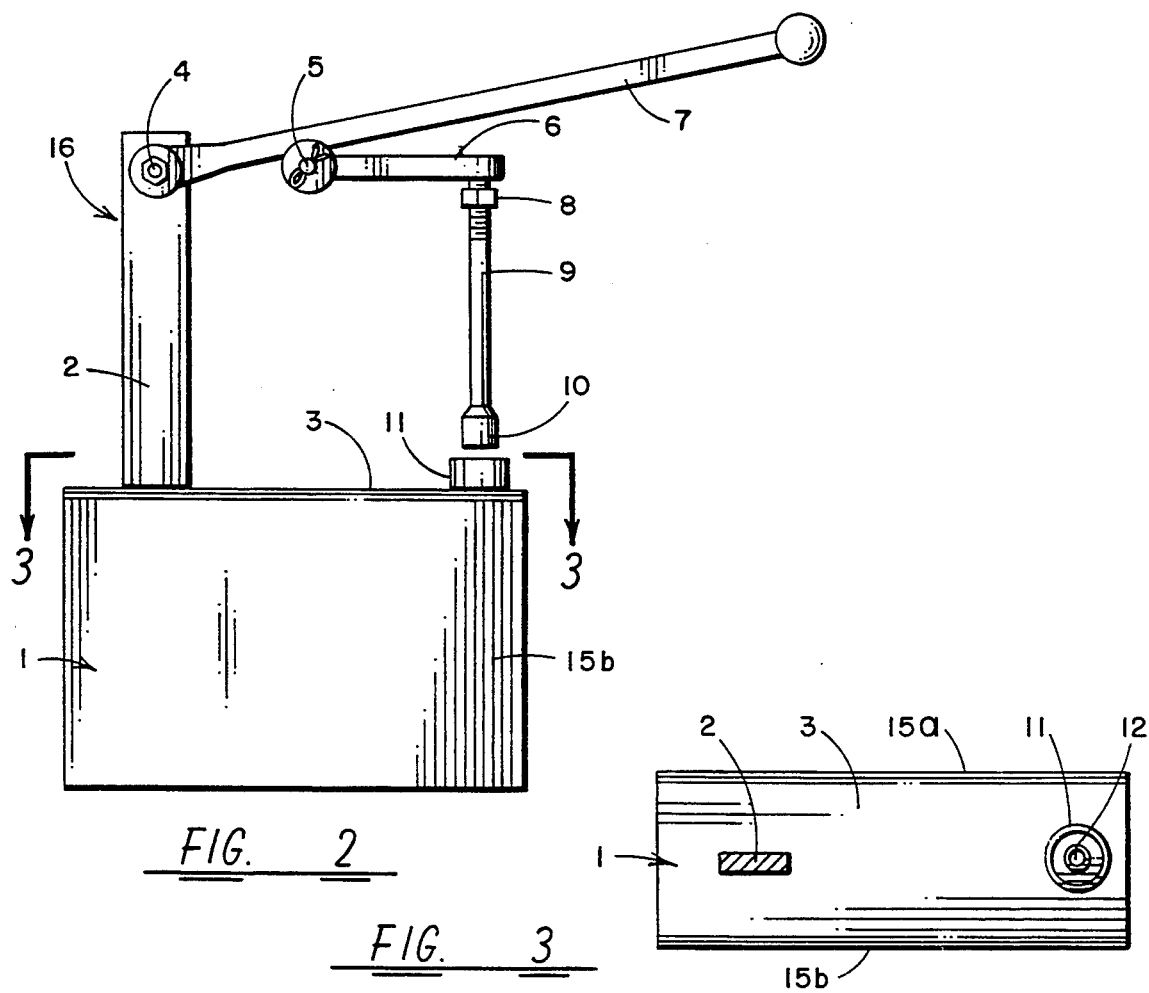
FIG. 2 is a side view of the poultry press with its handle in a slightly raised position.

In FIG. 2 the same components are shown as described in FIG. 1, the only difference being that the handle 7 is in a slightly raised position causing the press cup 10 to move up and out of the poultry holding ridge 11.

Figure 3:
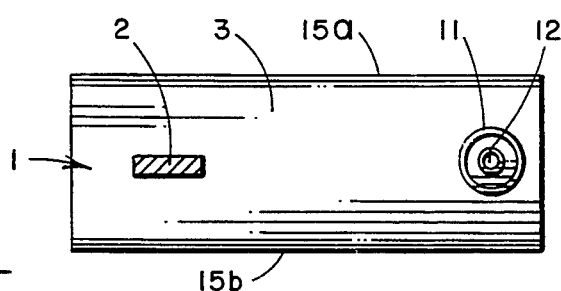
FIG. 3 is a cross-sectional top view of the poultry press of FIG. 2 along lines 3—3.

The top partial cross-section view in FIG. 3 shows the base portion 1 having the two sides 15a and 15b. Also, the aperture 12 inside the ridge 11 is shown. The aperture 12 allows the end of the exposed chicken bone to be inserted therein and the ridge 11 holds the chicken in place and keeps it from slipping during the pressing process.

In FIG. 4 a chicken drumstick 13 is shown in place before pressing, having a small exposed bone 14 inserted in the aperture 12 and the press cup 10 on the other end of the chicken drumstick 13. In this view the handle 7 is shown in a raised position to accommodate the chicken drumstick 13. Although the press shaft 9 could be mounted directly to the handle 7 and accomplish the same result, preferably the press shaft 9 is mounted to a boom 6 pivotly mounted to the handle 7 at pivot point 5. The latter arrangement enables the press to accommodate almost any length of poultry drumstick or wing as it allows the press cup 10 to be more easily aligned over the drumstick 13 and aperture 14. Otherwise, with long drumsticks the press shaft 9 would be at such an extreme angle to the aperture that the press would likely not achieve the intended result.

In FIG. 5 the chicken drumstick 13 is shown after the pressing process with the meat at the upper end above the aperture 12 and exposed bone 14 at the other end below the support plate 3 of the base portion 1. The latter result is accomplished merely by taking one's hand and exerting a downward force on the press handle 7 until the meat is pushed to the upper end of the drumstick 13.

In the final figure, FIG. 6, another view of the chicken drumstick 13 after the pressing process is shown. In this view both side walls 15a and 15b of the base portion 1 are illustrated. After the pressing process the chicken drumstick or wing 13 can be removed merely by pulling upward on the handle 7 and pulling the drumstick 13 from the aperture 12. The end result of using this poultry press is a drumstick or wing 13 which has all of its meat clumped at one end with exposed bone 14 at the other end. In this manner the poultry can be prepared and cooked and then placed upside down on the end having the meat portion with the bone 14 sticking up. Then the drumstick 13 can be eaten easily by holding the exposed bone 14 and eating the clumped meat at the other end of the drumstick 13. Preparing a drumstick in this manner eliminates the mess associated with eating an entire wing or drumstick which has not been prepared using this poultry press.

Chicken prepared using the present invention has been proven to result in a product that is juicier and tastier than regular chicken due to the meat being clumped together and perhaps reducing the likelihood that the meat will be overcooked.

The poultry press described above may be made of almost any rigid material, such as metal or even plastic. However, as it is designed to be used in restaurants, it would likely be made of stainless steel, which is easier to maintain and keep sanitary.

The poultry press has been described in its preferred embodiment as using chicken drumsticks even though it can be used with other poultry pieces, such as wings and further, with any meat, perhaps even ribs. If the device is used in conjunction with poultry wings, then it is recommended that one bone in the wing first be removed from the wing, leaving one bone remaining for insertion into the aperture. In this manner the wing can be pressed so that it looks more like a chicken drumstick than a wing, as all meat would be moved to one end of the bone.

Although the poultry press described herein is manual rather than automatic, the device could easily be made automatic by the addition of pneumatic or hydraulic means to the press portion to cause the handle 7 and press shaft 9 to be forced downward when desired. Also, the device could be made to operate electrically by the addition of a rotary motor to the pivot point 4 of the device such that when activated the handle 7 and press shaft 9 would be pushed downward.

Although a preferred embodiment of the present invention has been presented and described in detail hereinabove, other modifications and variations thereto which achieve the same result are intended to be covered by this invention as set forth in the claims appended hereto.

Having thus described my invention, I claim:

1. A device for preparing poultry wings and drumsticks, such as chicken and other meats, so that meat on a bone is gathered at one end with the exposed bone at the other, the device comprising:

base portion having at least two side walls;

a support plate mounted on the base portion between the two side walls to leave an open area below the support plate between the two walls, said support plate having an aperture at one end for inserting the bone end of a meat product;

a support column mounted on the support plate at the end opposite to the aperture;

a press portion comprising a handle pivotally connected at one end thereof to the support column and extending over the support plate to a point over the aperture;

a press boom pivotally connected at one end thereof to the handle at a position proximate the pivotal connection of the handle to the support column; and a downwardly extending press shaft mounted at the opposite end thereof to the press boom, said shaft further having a plunger-shaped press cup on a lower end for holding the meat so when the handle is pressed downwardly the bone is pushed through the aperture and the meat is pushed upwardly, leaving the bone exposed at one end with all of the meat compressed at the other end of the bone.

2. The device of claim 1 wherein the handle is pivotly mounted on an upper end of a vertical extension from the support plate to achieve more leverage when pressing downward on the handle.

3. The device of claim 1 or 2 wherein the support plate contains an elevated ridge surrounding the aperture to better hold the meat and keep it in place when downward pressure is asserted on the handle during processing.

* * * * *